(12) United States Patent
Kim

(10) Patent No.: US 6,781,403 B2
(45) Date of Patent: Aug. 24, 2004

(54) LIQUID CRYSTAL DISPLAY PANEL FOR TESTING LINE ON GLASS TYPE SIGNAL LINES

(75) Inventor: Dae Hong Kim, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/299,791

(22) Filed: Nov. 20, 2002

(65) Prior Publication Data

US 2003/0117165 A1 Jun. 26, 2003

(30) Foreign Application Priority Data

Dec. 20, 2001 (KR) ........................................ P2001-81564

(51) Int. Cl.[7] ............................................. G01R 31/00
(52) U.S. Cl. .......................................................... 324/770
(58) Field of Search ................................ 324/765, 770, 324/158.1, 75, 768, 769; 349/149, 151, 152

(56) References Cited

U.S. PATENT DOCUMENTS

| | | | | |
|---|---|---|---|---|
| 5,504,348 A | * | 4/1996 | Yoshida et al. | 257/59 |
| 5,546,013 A | * | 8/1996 | Ichioka et al. | 324/770 |
| 5,909,035 A | * | 6/1999 | Kim | 257/59 |
| 6,028,442 A | * | 2/2000 | Lee et al. | 324/770 |
| 6,566,902 B2 | * | 5/2003 | Kwon et al. | 324/770 |

* cited by examiner

Primary Examiner—David A. Zarneki
Assistant Examiner—Tung X. Nguyen
(74) Attorney, Agent, or Firm—McKenna Long & Aldridge LLP

(57) ABSTRACT

A liquid crystal display panel for making a LOG-type signal line test for detecting a short imperfection with a LOG-type signal line group even upon shorting of a shorting bar. In the panel, a picture display part has a plurality of liquid crystal cells, each of which is arranged at each intersection area between gate lines and data lines. Line on glass type signal lines are provided at an outer area of the picture display part by a line on glass system to apply signals required for driving external drive integrated circuits. At least two gate-shorting bars apply a test signal by separating the gate lines into two groups and separating partial signal lines of the line on glass type signal lines into at least two groups. At least two data shorting bars apply a test signal by separating the data lines into two groups and separating the remaining signal lines of the line on glass type signal lines into at least two groups.

18 Claims, 4 Drawing Sheets

LIQUID CRYSTAL DISPLAY PANEL FOR TESTING LINE ON GLASS TYPE SIGNAL LINES

This application claims the benefit of Korean Patent Application No. 2001-81564, filed on Dec. 20, 2001, which hereby incorporated by reference for all purposes as if fully set forth herein.

BACKGROUND OF THE INVENTION

1. Field of the Invention

This invention relates to a liquid crystal display, and more particularly to a liquid crystal display panel of line on glass (LOG) type that is adapted to test any short imperfections of LOG-type patterns provided on the liquid crystal display panel.

2. Description of the Related Art

Generally, a liquid crystal display (LCD) controls a light transmittance of a liquid crystal using an electric field to display a picture. For example, the LCD includes a liquid crystal display panel having liquid crystal cells arranged in a matrix type, and a driving circuit for driving the liquid crystal display panel.

In a conventional liquid crystal display panel, gate lines and data lines are arranged in such a manner to cross each other. The liquid crystal cell is positioned at each area where the gate lines cross the data lines. The liquid crystal display panel is provided with a pixel electrode and a common electrode for applying an electric field to each of the liquid crystal cells. Each pixel electrode is connected, via source and drain electrodes of a thin film transistor acting as a switching device, to any one of data lines. The gate electrode of the thin film transistor is connected to any one of the gate lines allowing a pixel voltage signal to be applied to the pixel electrodes for each one line.

The driving circuit includes a gate driver for driving the gate lines, a data driver for driving the data lines, a timing controller for controlling the gate driver and the data driver, and a power supply for supplying various driving voltages used in the LCD. The timing controller controls a driving timing of the gate driver and the data driver and applies a pixel data signal to the data driver. The power supply generates driving voltages such as a common voltage Vcom, a gate high voltage Vgh and a gate low voltage Vgl, etc. The gate driver sequentially applies a scanning signal to the gate lines to sequentially drive the liquid crystal cells on the liquid crystal display panel one line by one line. The data driver applies a data voltage signal to each of the data lines when the gate signal is applied to any one of the gate lines. Accordingly, the LCD controls a light transmittance by an electric field applied between the pixel electrode and the common electrode in accordance with the pixel voltage signal for each liquid crystal cell, to thereby display a picture.

The data driver and the gate driver directly connected to the liquid crystal display panel are integrated into a plurality of integrated circuits (ICs). Each data drive IC and gate drive IC are mounted in a tape carrier package (TCP) for connection to the liquid crystal display panel by a tape automated bonding (TAB) system, or mounted onto the liquid crystal display panel by a chip on glass (COG) system.

The drive ICs connected to each other, via the TCP, and to the liquid crystal display panel by the TAB system receive control signals and direct current voltage signals inputted from the exterior over signal lines mounted onto a printed circuit board (PCB) connected to the TCP. More specifically, the data drive ICs are connected, in series to each other, via signal lines mounted onto the data PCB, and commonly receive control signals from the timing control signal, a pixel data signal and driving voltages from the power supply. The gate drive ICs are connected, in series, via signal lines mounted onto the gate PCB, and commonly receive control signals from the timing controller and driving voltages from the power supply.

The drive ICs mounted onto the liquid crystal display panel by the COG system, are connected to each other by a line on glass (LOG) system in which signal lines are mounted on the liquid crystal display panel, at a lower glass, and receive control signals from the timing controller and the power supply and driving voltages.

Recently, even when the drive ICs are connected to the liquid crystal display panel by the TAB system, the LOG system has been employed to eliminate the PCB, thereby permitting the manufacture of a thinner liquid crystal display.

Particularly, signal lines connected to the gate drive ICs requiring relatively small signal lines are provided on the liquid crystal display panel by the LOG system eliminate the need for the gate PCB. In other words, the gate drive ICs of TAB system are connected, in series, to each other over signal lines mounted onto the lower glass of the liquid crystal display panel, and commonly receive control signals and driving voltage signals, which are hereinafter referred to as "gate driving signals".

For instance, as shown in FIG. 1, is a conventional liquid crystal display omitting the gate PCB by utilizing LOG-type signal wiring includes a liquid crystal display panel 1, a plurality of data TCP's 8 connected between the liquid crystal display panel 1 and a data PCB 12, a plurality of gate TCP's 14 connected to other side of the liquid crystal display panel 1, data drive ICs 10 mounted in the data TCP's 8, and gate drive ICs mounted in the gate TCP's 14.

The liquid crystal display panel 1 includes a lower substrate 2 provided with various signal lines and a thin film transistor array, an upper substrate provided with a color filter array, and a liquid crystal injected between the lower substrate 2 and the upper substrate 4. Such a liquid crystal display panel 1 is provided with a picture display area 21 that consists of liquid crystal cells provided at intersections between gate lines 20 and data lines 18 for the purpose of displaying a picture. At the outer area of the lower substrate 2, located at the outer side of the picture display area 21, data pads extended from the data lines 18, and gate pads extended from the gate lines 20, are positioned. Further, a LOG-type signal line group 26, for transferring gate-driving signals applied to the gate drive IC 16, is positioned at the outer edge area of the lower substrate 2.

The data TCP 8 supports the data drive IC 10, and is provided with input pads 24 and output pads 25 electrically connected to the data drive IC 10. The input pads 24 of the data TCP 8 are electrically connected to the output pads of the data PCB 12 while the output pads 25 thereof are electrically connected to the data pads on the lower substrate 2. Furthermore, the first data TCP 8 is further provided with a gate driving signal transmission group 22 electrically connected to the LOG-type signal line group 26 on the lower substrate 2. This gate driving signal transmission group 22 applies gate driving signals from the timing controller and the power supply, via the data PCB 12, to the LOG-type signal line group 26.

The data drive ICs 10 convert digital pixel data signals into analog pixel voltage signals to apply them to the data lines 18 on the liquid crystal display panel.

Similarly, the gate TCP 14 supports a gate drive IC 16, and is provided with a gate driving signal transmission line group 28 electrically connected to the gate drive IC 16 and output pads 30. The gate driving signal transmission line group 28 is electrically connected to the LOG-type signal line group 26 on the lower substrate 2 while the output pads 30 are electrically connected to the gate pads on the lower substrate 2.

Each gate drive IC 16 sequentially applies a scanning signal being a gate high voltage signal Vgh to a gate line 20 in response to input control signals. Further, the gate drive IC 16 applies a gate low voltage signal Vgl to the gate line 20 in the remaining interval when the gate high voltage signal Vgh is not supplied.

As shown in FIG. 2, a conventional LOG-type signal line group 26 usually consists of signal lines for supplying direct current voltage signals such as a gate high voltage signal Vgh, a gate low voltage signal Vgl, a common voltage signal Vcom, a ground voltage signal GND and a supply voltage signal Vcc and gate control signals such as a gate start pulse GSP, a gate shift clock signal GSC and a gate enable signal GOE. Such a LOG-type signal line group 26 is formed simultaneously with the gate lines 20 on the lower substrate 2.

Hereinafter, a thin film transistor array process of the lower substrate 2 will be briefly described.

A gate metal layer is deposited onto the lower substrate 2 and then patterned to thereby provide the LOG-type signal line group 26 along with the gate lines 20 and the gate pads. Next, a channel part of the thin film transistor is formed by entirely coating a gate insulating film, depositing a semiconductor layer and then patterning them. Next, a source/drain metal layer is deposited and patterned to form the data lines 18 and the data pads. After the protective film is entirely coated, contact holes for exposing the gate pads, the data pads and the drain electrode, etc. are formed. Finally, a transparent metal layer is deposited and patterned to provide a pixel electrode connection to the drain electrode and a protective electrode connection to the gate pads and the data pads.

After the lower substrate 2 provided with the thin film transistor array is joined to the upper substrate 4 provided with a color filter array, a liquid crystal is injected therebetween and sealed to complete the liquid crystal display panel 1. After completion of the liquid crystal display panel 1, a test process is conducted to determine a state of the liquid crystal cells and any short imperfections between lines.

For the purpose of testing the liquid crystal display panel 1, the data lines 18 and the gate lines 20 is usually extended toward the outer side of the cutting line of the liquid crystal display panel 1 for electrical connection to a testing shorting bar.

The data shorting bars consist of odd data shorting bars commonly connected to odd-numbered data lines and even data shorting bars commonly connected to even-numbered data lines to test the data lines 18 in groups with odd lines and even lines. The odd data shorting bars and the even data shorting bars are provided at different layers with the gate insulating film in between for an electrical insulation. For example, if the even data shorting bars are formed from a source/drain metal layer along with the data lines, the odd data shorting bars are formed from a gate metal layer along with the gate lines. The odd data shorting bars provided at the gate metal layer are electrically connected, via a contact electrode (i.e., a transparent metal) passing through the gate insulating film and the protective film, to the even data lines.

Similarly, the gate shorting bars consist of odd gate shorting bars commonly connected to odd-numbered gate lines and even gate shorting bars commonly connected to even-numbered gate lines to test the gate lines 20 in groups with the odd lines and the even lines. The odd gate shorting bars and the even gate shorting bars are provided at different layers with the gate insulating film in between for an electrical insulation. For example, if the odd gate shorting bars are formed from a gate metal layer along with the gate lines, the odd gate shorting bars are formed from a source/drain metal layer along with the data lines. The even gate shorting bars provided at the source/drain metal layer are electrically connected, via a contact electrode (i.e., a transparent metal) passing through the gate insulating film and the protective film, to the even gate lines.

A test signal is applied to the odd and even data shorting bars connected to the data lines and the odd and even gate shorting bars connected to the gate lines to detect any abnormality of the liquid crystal cells and any short imperfection between signal lines.

This testing process of the liquid crystal display panel 1 is carried out at the same time with a short imperfection test for the LOG-type signal line 26. As shown in FIG. 2, even-numbered LOG pads 32e connected are extended in such a manner to be connected to the even data shorting bars 36 formed from a gate metal layer. On the other hand, odd-numbered LOG pads 34o are extended in such a manner to be connected to the odd gate shorting bars 38 formed from a gate metal layer. A current is applied between the even data shorting bar 36 and the odd gate shorting bar 38 connected to the LOG-type signal line group being separated into the odd number and the even number, thereby measuring a resistance value to detect any shorting imperfections between the LOG-type signal line groups 26. Thus, if a resistance value measured between the odd data shorting bar 36 and the odd gate shorting bar 38 is less than a reference value, and then there is a shorting imperfection.

If any one of the even data shorting bar 32e and the odd gate shorting bar 34o for detecting a shorting imperfection of the LOG-type signal line group 26 is shorted at the outer side, then an imperfection of the cell can be determined when a pattern test is made of the inner side of the picture display part. It is impossible to make a short imperfection test with respect to the LOG-type signal line group 26.

SUMMARY OF THE INVENTION

Accordingly, the present invention is directed to a liquid crystal display panel for making a LOG-type signal line test capable of detecting a short imperfection with respect to a LOG-type signal line group even upon shorting of a shorting bar that substantially obviates one or more of the problems due to limitations and disadvantages of the related art.

An advantage of the present invention is to provide a liquid crystal display panel for testing a LOG-type signal line according to an embodiment of the present invention includes a picture display part having a plurality of liquid crystal cells, each of which is arranged at each intersection area between gate lines and data lines; line on glass type signal lines, being provided at an outer area of the picture display part by a line on glass system, for applying signals required for a driving of external drive integrated circuits; at least two gate shorting bars for applying a test signal by separating the gate lines to two groups and separating partial signal lines of the line on glass type signal lines into at least two groups; and at least two data shorting bars for applying a test signal by separating the data lines to two groups and separating the remaining signal lines of the line on glass type signal lines into at least two groups.

In the liquid crystal display panel according to the present invention, said at least two gate shorting bars includes an odd gate shorting bar are commonly connected to odd-numbered gate lines of the gate lines and, at the same time, commonly connected to first odd-numbered signal lines of the line on glass type signal lines; and an even gate shorting bar commonly connected to even-numbered gate lines of the gate lines and, at the same time, commonly connected to second odd-numbered signal lines of the line on glass type signal lines. Thus, the at least two data shorting bars includes an even data shorting bar commonly connected to even-numbered data lines of the data lines and, commonly connected to first even-numbered signal lines of the line on glass type signal lines; and an odd data shorting bar commonly connected to odd-numbered data lines of the data lines and, at the same time, commonly connected to second even-numbered signal lines of the line on glass type signal lines.

Otherwise, the at least two gate shorting bars includes an odd gate shorting bar commonly connected to odd-numbered gate lines of the gate lines and, commonly connected to first even-numbered signal lines of the line on glass type signal lines; and an even gate shorting bar commonly connected to even-numbered gate lines of the gate lines and, commonly connected to second even-numbered signal lines of the line on glass type signal lines. Thus, the least two data shorting bars includes an even data shorting bar commonly connected to even-numbered data lines of the data lines and, commonly connected to first odd-numbered signal lines of the line on glass type signal lines; and an odd data shorting bar commonly connected to odd-numbered data lines of the data lines and, commonly connected to second odd-numbered signal lines of the line on glass type signal lines.

The odd gate-shorting bar and the even gate-shorting bar are separately formed from a gate metal layer and a source/drain metal layer, respectively. The gate shorting bar provided at the source/drain metal layer being electrically connected, via a contact electrode, to the gate lines and the line on glass type signal lines formed from the gate metal layer; and said odd data shorting bar and said even data shorting bar are separately formed from a gate metal layer and a source/drain metal layer, respectively. The data shorting bar provided at the gate metal layer being electrically connected, via a contact electrode, to the data lines formed from the source/drain metal layer while said data shorting bar being electrically connected, via the contact electrode, to the line on glass type signal lines formed from the gate metal layer.

The contact electrode is formed from a transparent electrode layer.

The line on glass type signal lines supply signals required for gate drive integrated circuits supported in a tape carrier package.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, an example of which is illustrated in the accompany drawings.

Figure 1:
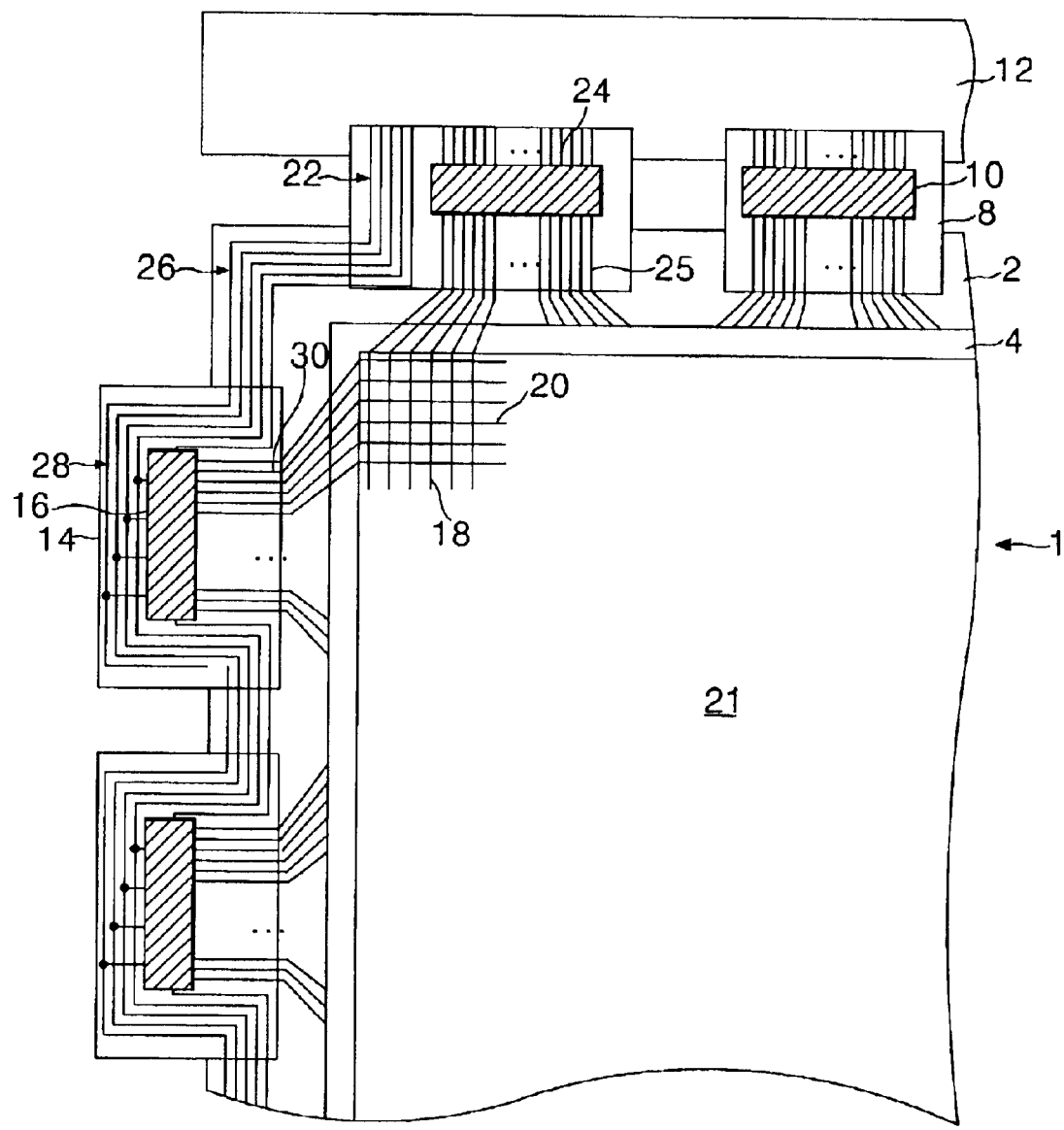
FIG. 1 is a schematic plan view showing a configuration of a conventional line on glass type liquid crystal display.
Figure 2:
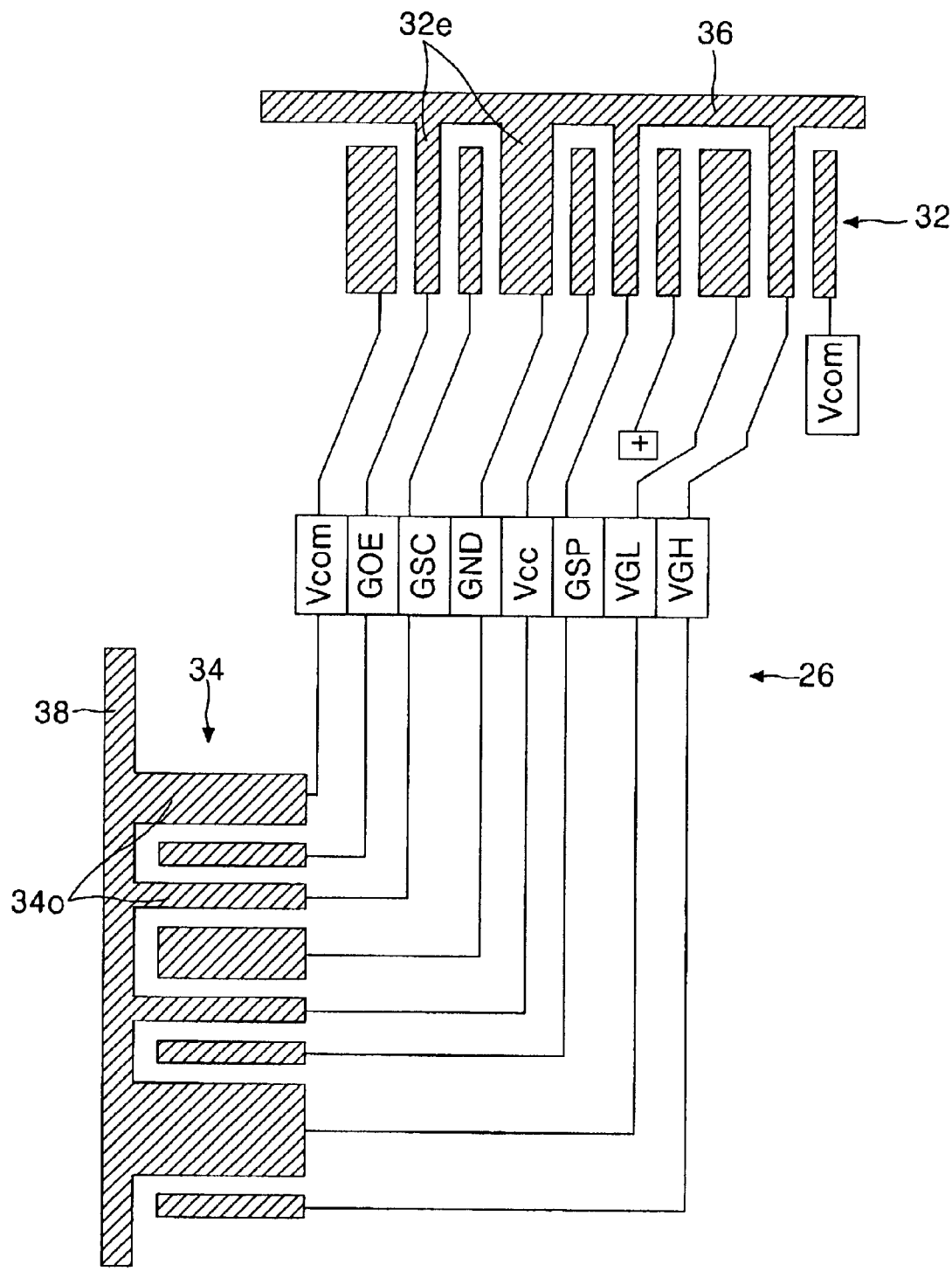
FIG. 2 depicts a configuration of a shorting bar for testing a short imperfection of a conventional line on glass type signal line.
Figure 3:
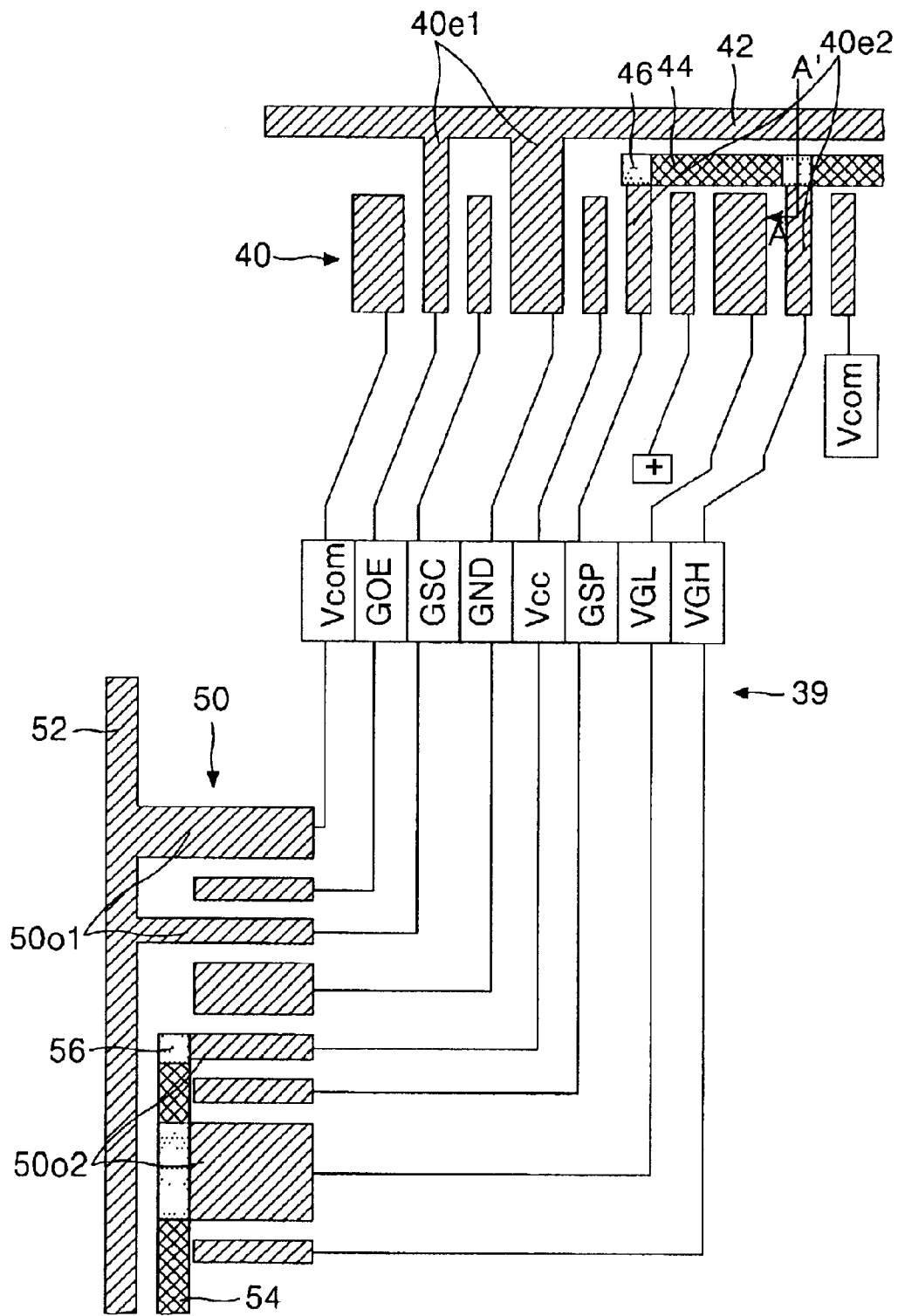
FIG. 3 depicts a configuration of a shorting bar for testing a short imperfection of a line on glass type signal line according to an embodiment of the present invention.

Referring to FIG. 3, there is shown a LOG-type signal line group of a liquid crystal display panel according to an embodiment of the present invention.

As shown in FIG. 3, the LOG-type signal line group 39 consists of gate driving signal transmission lines from a time controller and a power supply. More specifically, the LOG-type signal line group 39 consists of signal lines for supplying direct current voltage signals from a power supply such as a gate high voltage signal Vgh, a gate low voltage signal Vgl, a common voltage signal Vcom, a ground voltage signal GND and a supply voltage signal Vcc and gate control signals from a timing controller such as a gate start pulse GSP, a gate shift clock signal GSC and a gate enable signal GOE. Such a LOG-type signal line group 39 is usually formed simultaneously with the gate lines on the lower substrate 2.

The LOG-type signal line group 39 is extended into the outside of the cutting line of the liquid crystal display panel to be electrically connected to a testing shorting bar for testing a short imperfection after completion of the liquid crystal display panel. More specifically, the even-numbered LOG-type signal lines of the LOG-type signal line group 39 are connected, via even-numbered LOG pads 40e of LOG pads 40 connected to the data TCP, to data shorting bars 42 and 44.

Still referring to FIG. 3, the data shorting bars 42 and 44 consist of even data shorting bars 42 commonly connected to even-numbered data lines of a picture display part (not shown), and odd data shorting bars 44 commonly connected to odd-numbered data lines. The even data shorting bar 42 and the odd data shorting bar 44 are provided at different layers with the gate insulating film in between for an electrical insulation. For example, if the even data shorting bar 42 is formed from a source/drain metal layer along with the data lines, then the odd data shorting bar 44 is formed from a gate metal layer along with the gate lines. The even data shorting bar 42 provided at the gate metal layer is electrically connected, via a contact electrode (i.e., a transparent metal) passing through the gate insulating film and the protective film, to the even data lines.

The even-numbered LOG pads 40e extended into the outside of the cutting line is divided into first even-numbered LOG pads 40e1 connected to the even data shorting bar 42 formed from a gate metal layer and second even-numbered LOG pads 40e2 connected to the odd data shorting bar 44 formed from a source/drain metal layer. Thus, the second even-numbered pads 40e2 are electrically connected, via a contact electrode 46, to the odd data shorting bar 44 formed from a source/drain metal layer.

Still referring to FIG. 3, alternatively, the first even-numbered LOG pads 40e1 may be electrically connected, via the contact electrode, to the odd data shorting bar 44 formed from a source/drain metal layer while the second even-numbered LOG pads 40e2 may be electrically connected to the even data shorting bar 42 formed from a gate metal layer.

Similarly, the odd-numbered LOG-type signal lines are connected, via the odd-numbered LOG pads 50o of the LOG pads 50 connected to the gate TCP, to gate shorting bars 52 and 54.

Still referring to FIG. 3, the gate shorting bars 52 and 54 consist of odd gate shorting bars 52 commonly connected to odd-numbered gate lines of the picture display part (not shown), and even gate shorting bars 54 commonly connected to even-numbered gate lines. The odd gate shorting bar 52 and the even gate shorting bar 54 are provided at different layers with the gate insulating film in between for an electrical insulation. For example, if the odd gate shorting bar 52 is formed from a gate metal layer along with the gate lines, then the odd gate shorting bar 54 is formed from a source/drain metal layer along with the data lines. The even gate shorting bar 54 provided at the source/drain metal layer is electrically connected, via a contact electrode (i.e., a transparent metal) passing through the gate insulating film and the protective film, to the even gate lines.

The odd-numbered LOG pads 50o extended into the outside of the cutting line are divided into first odd-numbered LOG pads 50o1, connected to the odd gate shorting bar 52 formed from a gate metal layer, and second odd-numbered LOG pads 50o2, connected to the even gate shorting bar 54 formed from a source/drain metal layer. The second odd-numbered LOG pads 50o2 are electrically connected, via a contact electrode 56, to the even gate shorting bar 54.

Alternatively, the first odd-numbered LOG pads 50o1 may be electrically connected, via the contact electrode, to the even gate shorting bar 54 formed from a source/drain metal layer while the second odd-numbered LOG pads 50o2 may be electrically connected to the odd gate shorting bar 52 formed from a gate metal layer.

Figure 4:
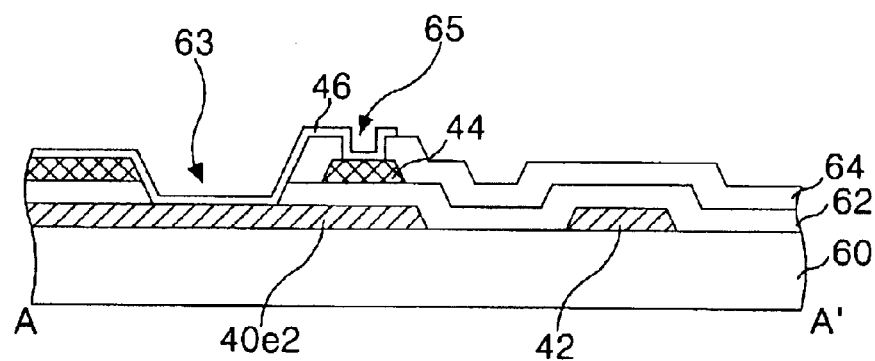
FIG. 4 is a section view of the pad portion and the shorting bar portion of the line on glass type signal line taken along the A—A' line in FIG. 3.

Referring now to FIG. 4 that shows a detailed section structure with a connection part between the second even-numbered LOG pads 40e2 and the odd data shorting bar 44 provided at a gate metal layer and a source/drain layer, respectively, with a gate insulating film therebetween.

Still referring to FIG. 4, the second even-numbered LOG pads 40e2 are formed from a gate metal layer on a glass substrate 60 along with other LOG pads 40 and 50, the LOG-type signal line group 39 and the even data shorting bar 42 as shown in FIG. 4. A gate insulating film 62 is provided thereon. The odd data shorting bar 44 formed from a source/drain metal layer is provided on the gate insulating film 62. A protective film 64 is provided on a source/drain metal layer including the odd data shorting bar 44, and first and second contact holes 63 and 65 for partially exposing the second even-numbered LOG pads 40e2 and the odd data shorting bar 44 are formed. Next, a contact electrode 46 formed from a transparent metal layer is formed over the first and second contact holes 63 and 65, to allow the second even-numbered LOG pads 40e2 and the odd data shorting bar 44 at a different layer, with the gate insulating film 62 in between to be electrically connected to each other.

Similarly, and now referring to FIG. 3, the second odd-numbered LOG pads 50o2 and the even gate shorting bar 54 provided at a gate metal layer and a source/drain metal layer, respectively, with the gate insulating film 62, are electrically connected to each other because the contact electrode 56 passes through the gate insulating film 62 and the protective film 64.

An electric current is applied to measure a resistance value to detect a short imperfection of the LOG-type signal line groups 39 between the data shorting bars 42 and 44 and the gate shorting bars 52 and 54 connected to the LOG-type signal line group 39 being separated into the odd number and the even number. More specifically, a current is applied between the odd gate shorting bar 52 connected to the first odd-numbered pads 50o1 and the even data shorting bar 42 connected to the first even-numbered pads 40e1 to measure a resistance value. Thus, if the resistance value measured between the odd gate shorting bar 52 and the even data shorting bar 42 is less than a reference value, then a short imperfection is detected.

Similarly, an electric current is applied to measure a resistance value between the odd gate shorting bar 54 connected to the second odd-numbered pads 50o2 and the odd data shorting bar 44 connected to the second even-numbered pads 40e2. Thus, if the resistance value measured between the even gate shorting bar 54 and the odd data shorting bar 44 is less than a reference value, then a short imperfection is detected.

In order to test a short imperfection of the LOG-type signal line group in this manner, the even-numbered pads 40e1 and 40e2 are separately connected to the even and odd data shorting bars 42 and 44, while the odd-numbered pads 50o1 and 50o2 are separately connected to the odd and even gate shorting bars 52 and 54. Thus, even though a short imperfection occurs at any one of the even and odd data shorting bars 42 and 44 or any one of the odd and even gate shorting bars 52 and 54, the remaining shorting bars allow an electric current to be applied to the LOG-type signal line group 39, thereby detecting a short imperfection.

As described above, according to the present invention, a pair of shorting bars connected to the odd lines and a pair of shorting bars connected to the even lines is provided for the purpose of testing a short imperfection of the LOG-type signal line group. Accordingly, even though a short imperfection occurs at any one of the shorting bars, the remaining shorting bars can detect a short imperfection of the LOG-type signal lines.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel for testing a line on glass type signal line, comprising:

a picture display part having a plurality of liquid crystal cells, each of which is arranged at each intersection area between gate lines and data lines;

line on glass type signal lines, being provided at an outer area of the picture display part by a line on glass system, for applying signals required for a driving of external drive integrated circuits;

at least two gate shorting bars for applying a first test signal by separating the gate lines to two groups and separating partial signal lines of the line on glass type signal lines into at least two groups; and at least two data shorting bars for applying a second test signal by separating the data lines to two groups and separating the remaining signal lines of the line on glass type signal lines into at least two groups.

2. The liquid crystal display panel according to claim 1, wherein said at least two gate shorting bars includes:

an odd gate shorting bar commonly connected to odd-numbered gate lines of the gate lines and, at the same time, commonly connected to first odd-numbered signal lines of the line on glass type signal lines; and an even gate shorting bar commonly connected to even-numbered gate lines of the gate lines and, at the same time, commonly connected to second odd-numbered signal lines of the line on glass type signal lines, and wherein said at least two data shorting bars includes:

an even data shorting bar commonly connected to even-numbered data lines of the data lines and, at the same time, commonly connected to first even-numbered signal lines of the line on glass type signal lines; and an odd data shorting bar commonly connected to odd-numbered data lines of the data lines and, at the same time, commonly connected to second even-numbered signal lines of the line on glass type signal lines.

3. The liquid crystal display panel according to claim 2, wherein said odd gate shorting bar and said even gate shorting bar are separately formed from a gate metal layer and a source/drain metal layer, respectively, said gate shorting bar provided at the source/drain metal layer being electrically connected, via a contact electrode, to the gate lines and the line on glass type signal lines formed from the gate metal layer; and said odd data shorting bar and said even data shorting bar are separately formed from a gate metal layer and a source/drain metal layer, respectively, said data shorting bar provided at the gate metal layer being electrically connected, via a contact electrode, to the data lines formed from the source/drain metal layer while said data shorting bar being electrically connected, via the contact electrode, to the line on glass type signal lines formed from the gate metal layer.

4. The liquid crystal display panel according to claim 3, wherein said contact electrode is formed from a transparent electrode layer.

5. The liquid crystal display panel according to claim 1, wherein said at least two gate shorting bars includes:

an odd gate shorting bar commonly connected to odd-numbered gate lines of the gate lines and, at the same time, commonly connected to first even-numbered signal lines of the line on glass type signal lines; and an even gate shorting bar commonly connected to even-numbered gate lines of the gate lines and, at the same time, commonly connected to second even-numbered signal lines of the line on glass type signal lines, and wherein said at least two data shorting bars includes:

an even data shorting bar commonly connected to even-numbered data lines of the data lines and, at the same time, commonly connected to first odd-numbered signal lines of the line on glass type signal lines; and an odd data shorting bar commonly connected to odd-numbered data lines of the data lines and, at the same time, commonly connected to second odd-numbered signal lines of the line on glass type signal lines.

6. The liquid crystal display panel according to claim 5, wherein said odd gate shorting bar and said even gate shorting bar are separately formed from a gate metal layer and a source/drain metal layer, respectively, said gate shorting bar provided at the source/drain metal layer being electrically connected, via a contact electrode, to the gate lines and the line on glass type signal lines formed from the gate metal layer; and said odd data shorting bar and said even data shorting bar are separately formed from a gate metal layer and a source/drain metal layer, respectively, said data shorting bar provided at the gate metal layer being electrically connected, via a contact electrode, to the data lines formed from the source/drain metal layer while said data shorting bar being electrically connected, via the contact electrode, to the line on glass type signal lines formed from the gate metal layer.

7. The liquid crystal display panel according to claim 6, wherein said contact electrode is formed from a transparent electrode layer.

8. The liquid crystal display panel according to claim 1, wherein said line on glass type signal lines supply signals required for gate drive integrated circuits mounted in a tape carrier package.

9. A method of manufacturing a liquid crystal display panel for testing a line on glass type signal line, comprising:

positioning a picture display part having a plurality of liquid crystal cells, each of which is arranged at each intersection area between gate lines and data lines;

forming line on glass type signal lines, being provided at an outer area of the picture display part by a line on glass system, for applying signals required for a driving of external drive integrated circuits;

positioning at least two gate shorting bars for applying a first test signal by separating the gate lines to two groups and separating partial signal lines of the line on glass type signal lines into at least two groups; and positioning at least two data shorting bars for applying a second test signal by separating the data lines to two groups and separating the remaining signal lines of the line on glass type signal lines into at least two groups.

10. The method of claim 9, wherein said step of positioning at least two gate shorting bars includes:

positioning an odd gate shorting bar commonly connected to odd-numbered gate lines of the gate lines and, at the same time, commonly connected to first odd-numbered signal lines of the line on glass type signal lines; and positioning an even gate shorting bar commonly connected to even-numbered gate lines of the gate lines and, at the same time, commonly connected to second odd-numbered signal lines of the line on glass type signal lines, and wherein said at least two data shorting bars includes:

positioning an even data shorting bar commonly connected to even-numbered data lines of the data lines and, at the same time, commonly connected to first even-numbered signal lines of the line on glass type signal lines; and positioning an odd data shorting bar commonly connected to odd-numbered data lines of the data lines and, at the same time, commonly connected to second even-numbered signal lines of the line on glass type signal lines.

11. The method of claim 10, wherein said step of positioning an odd gate shorting bar and said even gate shorting bar being separately formed from a gate metal layer and a source/drain metal layer, respectively, said gate shorting bar provided at the source/drain metal layer being electrically connected, via a contact electrode, to the gate lines and the line on glass type signal lines formed from the gate metal layer; and said odd data shorting bar and said even data shorting bar being separately formed from a gate metal layer and a source/drain metal layer, respectively, said data shorting bar provided at the gate metal layer being electrically connected, via a contact electrode, to the data lines formed from the source/drain metal layer while said data shorting bar being electrically connected, via the contact electrode, to the line on glass type signal lines formed from the gate metal layer.

12. The method of claim 11, wherein said contact electrode being formed from a transparent electrode layer.

13. The method of claim 9, wherein said step of positioning at least two gate shorting bars includes:

positioning an odd gate shorting bar commonly connected to odd-numbered gate lines of the gate lines and, at the same time, commonly connected to first even-numbered signal lines of the line on glass type signal lines; and positioning an even gate shorting bar commonly connected to even-numbered gate lines of the gate lines and, at the same time, commonly connected to second even-numbered signal lines of the line on glass type signal lines, and wherein said at least two data shorting bars includes:

positioning an even data shorting bar commonly connected to even-numbered data lines of the data lines and, at the same time, commonly connected to first odd-numbered signal lines of the line on glass type signal lines; and positioning an odd data shorting bar commonly connected to odd-numbered data lines of the data lines and, at the same time, commonly connected to second odd-numbered signal lines of the line on glass type signal lines.

14. The method of claim 13, wherein said odd gate shorting bar and said even gate shorting bar being separately formed from a gate metal layer and a source/drain metal layer, respectively, said gate shorting bar provided at the source/drain metal layer being electrically connected, via a contact electrode, to the gate lines and the line on glass type signal lines formed from the gate metal layer; and said odd data shorting bar and said even data shorting bar are separately formed from a gate metal layer and a source/drain metal layer, respectively, said data shorting bar provided at the gate metal layer being electrically connected, via a contact electrode, to the data lines formed from the source/drain metal layer while said data shorting bar being electrically connected, via the contact electrode, to the line on glass type signal lines formed from the gate metal layer.

15. The method of claim 14, wherein said contact electrode is formed from a transparent electrode layer.

16. The method of claim 9, wherein said line on glass type signal lines supply signals required for gate drive integrated circuits mounted in a tape carrier package.

17. A liquid crystal display panel for testing a line on glass type signal line, comprising:

a picture display part having a plurality of liquid crystal cells, each of the picture display part is arranged at each intersection area between gate lines and data lines;

LOG signal lines at an outer area of the picture display part by a line on glass system;

at least two gate shorting bars, each of the two gate shorting bars is electrically connected to at least one of the line on glass type signal lines; and at least two data shorting bars, each of the two data shorting bars is electrically connected to at least one of the line on glass type signal lines.

18. A liquid crystal display panel for testing a line on glass type signal line, comprising:

a picture display part having a plurality of liquid crystal cells, each of which is arranged at each intersection area between gate lines and data lines;

line on glass type signal lines, being provided at an outer area of the picture display part by a line on glass system, for applying signals required for a driving of external drive integrated circuits;

at least two gate shorting bars by separating the gate lines into two groups and separating partial signal lines of the line on glass type signal lines into at least two groups, wherein each of the two gate shorting bars is electrically connected to at least one of the line on glass type signal lines; and at least two data shorting bars by separating the data lines into two groups and separating the remaining signal lines of the line on glass type signal lines into at least two groups, wherein each of the two data shorting bars is electrically connected to at least one of the line on glass type signal lines.

* * * * *